(12) United States Patent
Wakasu

(10) Patent No.: US 6,453,053 B1
(45) Date of Patent: *Sep. 17, 2002

(54) IDENTIFICATION DATA INSERTION AND DETECTION SYSTEM FOR DIGITAL DATA

(75) Inventor: Yutaka Wakasu, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,270

(22) Filed: Dec. 19, 1997

(30) Foreign Application Priority Data

Dec. 25, 1996 (JP) .............................. 8-345487

(51) Int. Cl.[7] .................................. G06K 9/00
(52) U.S. Cl. ...................... 382/100; 382/233; 382/250; 382/251
(58) Field of Search ................... 382/100, 232, 382/250, 251, 233, 25; 380/4, 5, 7, 210, 287, 54; 713/176

(56) References Cited

U.S. PATENT DOCUMENTS 5,809,139 A * 9/1998 Girod et al. .................. 380/5
5,848,155 A * 12/1998 Cox .............................. 380/4
5,915,027 A * 6/1999 Cox et al. .................... 380/54

OTHER PUBLICATIONS

Cox et al., "Secure Spectrum Watermarking for Images, Audio and Video," IEEE, Jun. 1996, pp. 243–246.*
Bors et al., "Image Watermarking Using DCT Domain Constraints," IEEE, 09/96, pp. 231–234.*
Swanson et al., "Transparent Robust Image Watermarking," IEEE, 09/96, pp. 211–214.*
European Search Report completed Feb. 1, 2000 (place The Hague) Application No. EP 97 12 2830 together with cited references: (1) Nikkei Electronics Document No. XP002123614; (2) PCT Appln. No. WO 96/41468 A (Macrovision Corporation); (3) European Patent Application No. EP 0 690 595 A (Hewlett–Packard Company).
Japanese Office Action dated Jul. 21, 1999 with cited reference (1) "A Secure, Robust Watermark for Multimedia", Cox, Ingemar J. et al and (2) "Embedding Robust Labels Into Images for Copyright Protection", Zhao, Jian et al.

* cited by examiner

*Primary Examiner*—Phuoc Tran
(74) *Attorney, Agent, or Firm*—Micheal Best & Friedrich LLC; J. Warren Whitesel

(57) ABSTRACT

The invention provides an identification data insertion and detection system for digital data which improves the detection ratio when an image is converted into frequency components and electronic watermark data are embedded in a portion of an image having a strong frequency component and besides allows a statistical similarly to be calculated with a higher degree of accuracy. The identification data insertion system for digital data includes a DCT calculator for extracting blocks of 8×8 pixels from within a current image and performing DCT (discrete cosine transform) calculation for the blocks, a quantizer for quantizing data outputted from the DCT calculator, a quantization table for being referred to when the quantizer performs quantization, an electronic watermark data insertion element for inserting electronic watermark data into data after quantization, and an encoder for encoding data outputted from the electronic watermark data insertion element to produce MPEG data in which the electronic watermark data are inserted and outputting the MPEG data.

4 Claims, 8 Drawing Sheets

IDENTIFICATION DATA INSERTION AND DETECTION SYSTEM FOR DIGITAL DATA

BACKGROUND OF THE INVENTION

1. Field of the Invention

This invention relates to a system for processing a digital image, and more particularly to a system for embedding electronic watermark data as identification data having special information into a digital image.

2. Description of the Related Art

In recent years, illegal duplication of a digital image has become a serious problem.

In order to prevent illegal duplication, a system has been proposed wherein digital image data are ciphered such that only a reproduction system having a legal decipherment key can reproduce the ciphered digital image data. However, once the cipher is deciphered, later duplication cannot be prevented.

Thus, in order to prevent illegal use and duplication of a digital image, a method has been proposed wherein electronic watermark data which are special information are embedded into the digital image itself.

As such electronic watermark data for a digital image as described above, two kinds of electronic watermark data of visible electronic watermark data and invisible electronic watermark data are available.

The visible electronic watermark data are used such that a special character or symbol or the like is combined with an image so that it may be visually recognized. While the visible electronic watermark data deteriorate the picture quality, they have an effect of visually appealins to a user of a digital image for prevention of illegal use of the digital image.

An example of embedding of visible electronic watermark data is disclosed in Japanese Patent Laid-Open Application No. Heisei 8-241403. According to the method disclosed in the document just mentioned, visible electronic watermark data are combined with an original image such that only the brightness components of those pixels which correspond to an opaque portion of the electronic watermark data are varied while color components of the pixels are not varied. In this instance, the scaling value by which the brightness components of pixels are varied is determined based on color components, random numbers, values of pixels of the electronic watermark data and so forth.

On the other hand, the invisible electronic watermark data are embedded into an image so that the picture quality may not be deteriorated. Since the invisible electronic watermark data little deteriorate the picture quality, they are characterized in that they cannot be recognized visually.

However, if special information which allows identification of an author is embedded as the electronic watermark data, then also after illegal duplication is performed, the author can be specified by detecting the electronic watermark data. On the other hand, if duplication inhibition information is embedded, then, for example, when a reproduction apparatus detects the duplication inhibition information, it is possible to notify the user that duplication of the data is inhibited or to render a duplication prevention mechanism in the reproduction apparatus operative to limit duplication of the data by a video tape recorder (VTR) or the like.

One available methods of embedding invisible electronic watermark data into a digital image is to embed special information as electronic watermark data into a portion of pixel data such as a least significant bit (LSB) which has a comparatively little influence on the picture quality. However, where this method is applied, electronic watermark data can be removed readily from an image. For example, if a low-pass filter is used, then information of the LSB of a pixel is lost. Further, electronic watermark data are lost also by image compression processing since the image compression processing reduces the data amount by removing information at such a portion which has a comparatively little influence on the picture quality as mentioned above. Consequently, it is difficult to re-detect the electronic watermark data.

Another method is disclosed in Japanese Patent Laid-Open Application No. Heisei 6-315131.

In the method of the document just mentioned, a region which can be replaced, upon reproduction, by a peripheral region without causing deterioration of an image is detected using a correlation of images of successive frames, and the level of the region of an object of conversion is converted to embed particular information. In this method, upon reproduction, the region in which identification data are embedded is specified using the signal missing portion and the replacement information, and the portion is corrected to restore the image.

A further method is disclosed in Japanese Patent Laid-Open Application No. Heisei 5-30466 wherein a video signal is frequency converted and information having a frequency signal lower than a frequency band of the video signal after the frequency conversion is embedded into the video signal. In this method, the original video signal is extracted using a high pass filter while embedded identification data are extracted using a low pass filter.

As another method which involves frequency conversion of an image, a method has been proposed wherein an image is frequency converted and electronic watermark data are embedded into a region of the video signal after the frequency conversion in which strong frequency components are included (*Nikkei Electronics*. Apr. 22, 1996, No. 660, p.13).

In this method, since electronic watermark data are embedded into frequency components, the electronic watermark data are not lost even by image processing such as compression processing or filtering. Further, random numbers which exhibit a normal distribution are adopted as the electronic watermark data to prevent interference between electronic watermark data and make it difficult to destroy electronic watermark data without having a significant influence on the entire image.

According to the electronic watermark data embedding method in the method described above, an original image 501 is converted into frequency components using a DCT (discrete cosine transform) transformer 502 as seen in FIG. 5. Then, n data which exhibit comparatively high values in a frequency region are selected and individually represented by f(1), f(2), . . . , f(n), and electronic watermark data 503 (w(1), w(2), . . . , w(n)) are selected from within a normal distribution whose average is 0 and whose dispersion is 1. Then, $F(i)=f(i)+\alpha \times |f(i)| \times w(i)$ is calculated for each i by an electronic watermark data insertion element 504. Here, $\alpha$ is a scaling factor. Finally, DCT transform coefficients including those frequency components in which f(i) are replaced by F(i) are inverse transformed by an inverse DCT transformer 509 to obtain an image 510 in which the electronic watermark data is embedded.

Electronic watermark data is detected using the following method. In the detection method, an original image and electronic watermark data candidates $w(i)$ (where $i=1, 2, \ldots, n$) must be known.

Referring to FIG. 6, an original image 601 and an electronic watermark data containing image 602 are converted into frequency components using DCT transformers 603 and 604, respectively. In a frequency region, values of factors corresponding to $f(1), f(2), \ldots, f(n)$ in which electronic watermark data are embedded are represented by $F(1), F(2), \ldots, F(n)$, respectively. An electronic watermark data extractor 605 extracts electronic watermark data $W(i)$ based on $f(i)$ and $F(i)$ by calculation of $W(i)=(F(i)-f(i))/f(i)$. Then, an inner product calculator 608 calculates, based on electronic watermark data 609, a statistical similarity between $w(i)$ and $W(i)$ in accordance with $C=W\times w/(WD\times wD)$ using inner products of vectors. Here, $W=(W(1), W(2), \ldots, W(n))$, $w=(w(1), w(2), \ldots, w(n))$, WD=absolute value of the vector W, and wD=absolute value of the vector w. A statistical similarity discriminator 610 discriminates, when the statistical similarity C is higher than a particular value, that the pertaining electronic watermark data are embedded.

If electronic watermark data are embedded in an image using the method described above, then they can be effectively used when an author who owns the original image performs detection processing for digital image data which are supposed to be an illegal duplicate.

However, since the method described above requires an original image, although it is effective when an author who owns an original image performs detection processing for image data which are supposed to be an illegal duplicate, a reproduction apparatus of a terminal cannot perform electronic watermark data detection processing because it does not have the original image. Thus, another method which is an improvement over the method described above and is directed to terminal processing and particularly to an MPEG (Moving Picture Experts Group) system has been proposed.

According to the improved method, an original image is divided into blocks of 8 pixels×8 pixels, and embedding and extraction processing of electronic watermark data is performed regarding each block as a processing unit.

In electronic watermark data embedding processing, data are first set successively as $f(1), f(2), \ldots, f(n)$ in the ascending order of the frequency component of an AC component in a frequency region after discrete cosine transform in MPEG coding processing is completed, and electronic watermark data $w(1), w(2), \ldots, 2(n)$ are selected from within a normal distribution whose average is 0 and whose dispersion is 1, and then $F(i)=f(i)+\alpha\times avg(f(i))\times w(i)$ is performed for each i. Here, $\alpha$ is a scaling factor, and $avg(f(i))$ is a partial average which is an average of absolute values of three neighboring points to $f(i)$. Then, succeeding processing of MPEG coding processing is performed replacing $f(i)$ with $F(i)$.

Detection of electronic watermark data is performed in accordance with the following method. In this detection method, an original image is not required, but only it is required that data candidates $w(i)$ (where $i=1, 2, \ldots, n$) be known.

In a frequency region of each block after dequantization of MPEG decompression processing is completed, data are represented as $F(1), F(2), \ldots, F(n)$ in the ascending order of the frequency component. An average value of absolute values of three neighboring points to $F(i)$ is represented as a partial average $avg(F(i))$, and electronic watermark data $W(i)$ is calculated in accordance with $W(i)=F(i)/avg(F(i))$. Further, a sum total $WF(i)$ of $W(i)$ for one image is calculated for each i. Thereafter, a statistical similarity between $w(i)$ and $WF(i)$ is calculated in accordance with $C=WF\times w/(WFD\times wD)$ making use of an inner product of vectors. Here, $W=(WF(1), WF(2), \ldots, WF(n))$, $w=(w(1), w(2), \ldots, w(n))$, WFD=absolute value of the vector WF, and wD=absolute value of the vector w. When the statistical similarity C has a value higher than a particular value, it is discriminated that the electronic watermark data are embedded.

FIG. 7 shows a conventional system which embeds electronic watermark data using such a method as described above, and FIG. 8 shows a conventional system which detects electronic watermark data embedded by such a system as shown in FIG. 7.

Referring first to FIG. 7, in the system shown, a current image 701 is divided into blocks 702 of 8×8 pixels and discrete cosine transformed by a DCT transformer 703, and then electronic watermark data 704 are inserted into an output of the DCT transformer 703 by an electronic watermark data insertion element 705. In the electronic watermark data insertion element 705, partial averages mentioned above are calculated by a partial average calculator 706, and a result of the calculation and the electronic watermark data 704 are multiplied by a multiplier 708. Then, an output of the multiplier 708 is multiplied by a constant (scaling factor) α 707 by another multiplier 709. Then, a result of the multiplication is added to the image data from the DCT transformer 703 by an adder 710 to make image data in which the electronic watermark data are embedded. The image data are quantized by a quantizer 711 with reference to a quantization table 712 and then encoded by an encoder 713 to produce MPEG image data 714 in which the electronic watermark data are embedded, and the MPEG image data 714 are outputted.

Referring now to FIG. 8, in the system shown, MPEG image data 801 in which electronic watermark data are embedded are decoded by a decoder 802 and then dequantized by a dequantizer 803, whereafter they are inverse DCT transformed by an inverse DCT calculator 804 to restore original image data 805. Meanwhile, electronic watermark data are extracted from the output of the dequantizer 803 by an electronic watermark data extractor 806. In the electronic watermark data extractor 806, after partial average calculation by a partial average calculator 807 and division by a divider 808 are performed, sum totals $WF(i)$ for one screen are performed for each i by an adder 809. Then, inner products of the sum totals $W(i)$ and electronic watermark data 811 of an object of detection are calculated by an inner product calculator 810 to obtain a statistical similarity 812. Then, if the statistical similarity 812 has a value higher than a particular value, then it is discriminated that the electronic watermark data are embedded in the MPEG image data 801.

In the method disclosed in Japanese Patent Laid-Open Application No. Heisei 6-315131, since electronic watermark information is not embedded in all frames, illegal duplication cannot be prevented with regard to any frame in which the electronic watermark information is not embedded. Further, since successive frames represent still pictures and it is presupposed that there is no variation between successive frames, where moving pictures which involve strong movements are handled, a region into which electronic watermark data are to be embedded cannot be specified. Consequently, electronic watermark cannot be embedded.

Meanwhile, in the method disclosed in Japanese Patent Laid-Open No. Heisei 5-30466, since electronic watermark data are embedded into a portion of an image which is lower than a frequency region after frequency conversion of the image, the electronic watermark data can be removed readily using a band-pass filter.

Further, with the method wherein electronic watermark data are embedded into a portion having a strong frequency component after frequency conversion, while electronic watermark data cannot be removed using a filter or the like, electronic watermark data inserted after DCT processing are sometimes lost by quantization processing. This is because, where a value of any frequency component after DCT falls within a fixed range, it is converted into a particular representative value in quantization processing.

Accordingly, due to an action of quantization, the values of a partial average avg(f(i)) of three neighboring points upon insertion and a partial average avg(F(i)) of the three neighboring points upon detection are sometimes different by a large amount. In such an instance, the statistical similarity between extracted electronic watermark data and electronic watermark data to be detected exhibits a low value and makes a factor which causes an erroneous discrimination result.

SUMMARY OF THE INVENTION

It is an object of the present invention to provide an identification data insertion and detection system for digital data which improves the detection ratio when an image is converted into frequency components and electronic watermark data are embedded in a portion of an image having a strong frequency component.

It is another object of the present invention to provide an identification data insertion and detection system for digital data which allows a statistical similarly to be calculated with a higher degree of accuracy.

In order to attain the objects described above, according to the present invention, taking it into consideration that DCT coefficients are rounded by quantization, insertion of electronic watermark data is performed not in a stage between DCT processing and quantization processing, but after quantization. On the other hand, upon detection, electronic watermark data detection processing is performed prior to dequantization.

In the meantime, where insertion of electronic watermark data is performed in a stage between DCT processing and quantization processing similarly as in the conventional methods, when a partial average is to be calculated, an absolute value of a value obtained by multiplying an integral value obtained by division of a corresponding value of a quantization further by the corresponding value of the quantization table.

More particularly, according to an aspect of the present invention, there is provided an identification data insertion system for digital data for inserting electronic watermark data as identification data having special information into a digital image, comprising a DCT calculator for extracting matrix blocks of 8×8 pixels from a current image and performing discrete cosine transform calculation for the blocks, a quantizer for quantizing data outputted from the DCT calculator, a quantization table for being referred to when the quantizer performs quantization, an electronic watermark data insertion element for inserting electronic watermark data into the data after the quantization, and an encoder for encoding data outputted from the electronic watermark data insertion element.

The electronic watermark data insertion element may include a partial average calculator for calculating an average of absolute values of three neighboring points of each factor of the data outputted from the quantizer as a partial average, a first multiplier for multiplying the electronic watermark data by an output of the partial average calculator for the individual factors, a second multiplier for multiplying each factor of an output of the first multiplier by a constant to be used to vary the size of the electronic watermark data to be inserted, and an adder for adding an output of the second multiplier and the output of the quantizer for the individual factors.

According to another aspect of the present invention, there is provided an identification data detection system for digital data adapted to detect electronic watermark data inserted by the identification data insertion system for digital data described above and comprising a decoder for decoding compressed image data, a dequantizer for dequantizing data outputted from the decoder, an inverse DCT calculator for performing inverse discrete cosine transform calculation for data outputted from the dequantizer and outputting image data obtained by the inverse discrete cosine transform calculation, an electronic watermark data extractor for extracting and outputting, from among the data outputted from the decoder, those data which are supposed to be electronic watermark data, an adder for adding data in units of a block of 8×8 pixels outputted from the electronic watermark data extractor for individual factors over one screen, and an inner product calculator for calculating inner products of electronic watermark data to be detected and the data outputted from the adder to calculate a statistical similarity and outputting the statistical similarity.

The electronic watermark data extractor may include a partial average calculator for calculating an average of absolute values of three neighboring points of each of data in units of a matrix block of 8×8 pixels outputted from the decoder as a partial average, and a divider for dividing the data outputted from the decoder by the partial average outputted from the partial average calculator.

With the identification data insertion system and the identification data detection system for digital data, since electronic watermark data insertion processing is performed after quantization whereas electronic watermark data detection processing is performed prior to dequantization, otherwise possible loss or disappearance of electronic watermark data by quantization can be prevented, and the difference between a partial average used upon insertion and another partial average used upon detection is reduced. Consequently, a statistical similarity can be calculated with a higher degree of accuracy. Accordingly, the accuracy in detection of electronic watermark data is improved.

It is to be noted that the identification data insertion system and the identification data detection system for digital data may be combined so as to form a single identification data insertion and detection system for digital data.

According to a further aspect of the present invention, there is provided an identification data insertion system for digital data, comprising a DCT calculator for extracting matrix blocks of 8×8 pixels from a current image and performing discrete cosine transform calculation for the blocks, an electronic watermark data insertion element for inserting electronic watermark data into data after the discrete cosine transform outputted from the DCT calculator, a quantizer for quantizing data outputted from the electronic watermark data insertion element, a quantization table for being referred to when the quantizer performs quantization and when the electronic watermark data insertion element calculates a partial average, and an encoder for encoding data outputted from the quantizer.

The electronic watermark data insertion element may include a partial average calculator for calculating, using the quantization table when a partial average of the data outputted from the DCT calculator is to be calculated, an average among three neighboring points of absolute values of values obtained each by multiplying an integer value obtained by dividing a value of each factor outputted from the DCT calculator by a corresponding value of the quantization table by the corresponding value of the quantization table as a partial average of the pertaining factor, a first multiplier for multiplying an output of the partial average calculator by the electronic watermark data for the individual factors, a second multiplier for multiplying data outputted from the first multiplier by a constant to be used to vary the size of the electronic watermark data to be embedded, and an adder for adding the data outputted from the DCT calculator and data outputted from the second multiplier for the individual factors.

According to a still further aspect of the present invention, there is provided an identification data detection system for digital data adapted to detect electronic watermark data inserted by the identification data insertion system for digital data described above and comprising a decoder for decoding compressed image data, a dequantizer for dequantizing data outputted from the decoder, an inverse DCT calculator for performing inverse discrete cosine transform calculation for data outputted from the dequantizer and outputting image data obtained by the inverse discrete cosine transform calculation, an electronic watermark data extractor for extracting and outputting, from among the data outputted from the dequantizer, those data which are supposed to be electronic watermark data, an adder for adding data in units of a block of 8×8 pixels outputted from the electronic watermark data extractor for individual factors over one screen, and an inner product calculator for calculating inner products of electronic watermark data to be detected and the data outputted from the adder to calculate a statistical similarity and outputting the statistical similarity.

The electronic watermark data extractor may include a partial average calculator for calculating an average of absolute values of three neighboring points of each of data in units of a block of 8×8 pixels outputted from the dequantizer as a partial average, and a divider for dividing the data outputted from the dequantizer by the partial average outputted from the partial average calculator.

With the identification data insertion system wherein insertion of electronic watermark data is performed in a stage between DCT processing and quantization processing similarly as in the conventional methods and with the identification data detection system, when a partial average is to be calculated, an absolute value of a value obtained by multiplying an integral value obtained by division of a corresponding value of a quantization table further by the corresponding value of the quantization table. Consequently, the difference between a partial average used upon insertion and another partial average used upon detection is suppressed and a statistical similarity can be calculated with a higher degree of accuracy. Accordingly, the accuracy in detection of electronic watermark data is improved.

It is to be noted that the identification data insertion system and the identification data detection system for digital data may be combined so as to form a single identification data insertion and detection system for digital data.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
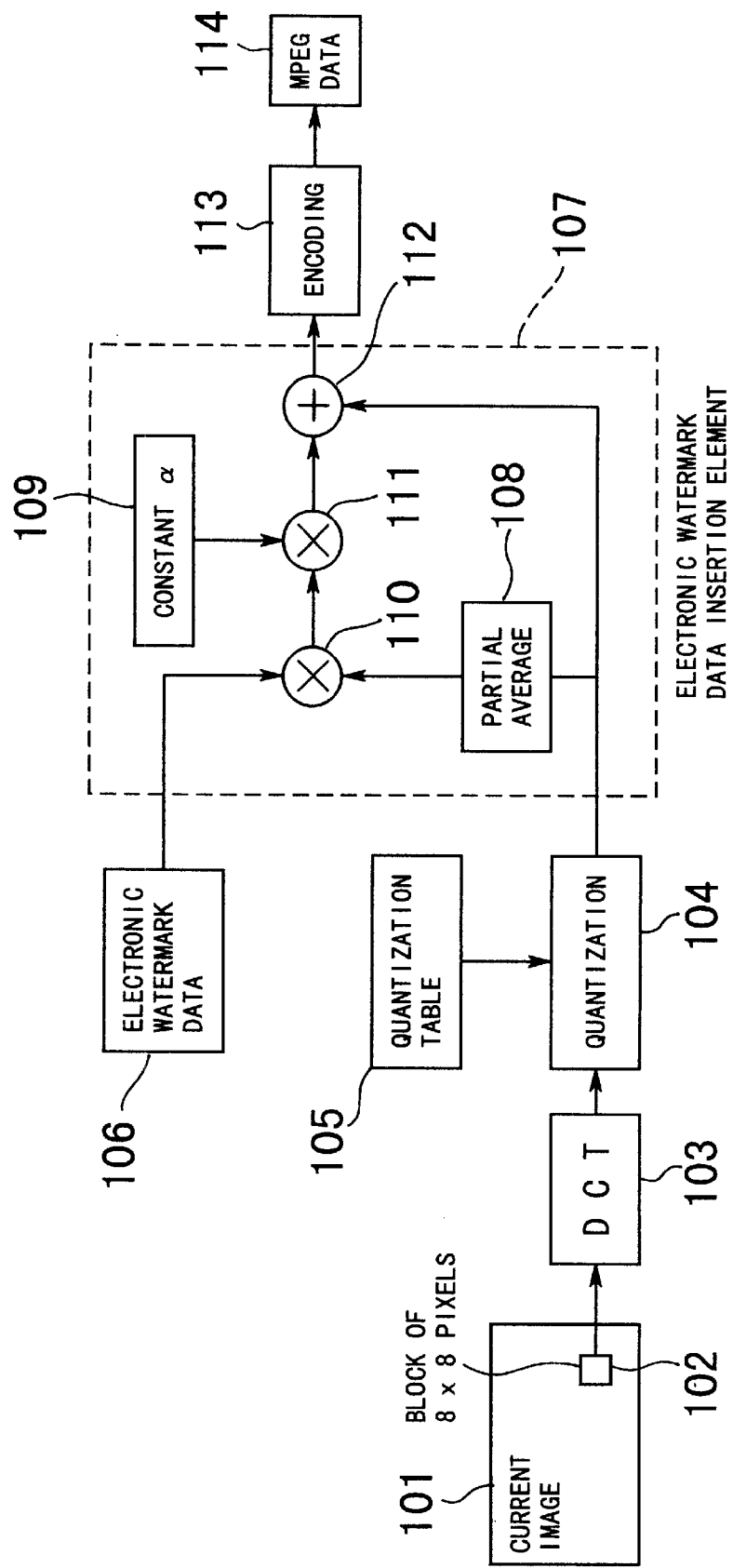
FIG. 1 is a block diagram of an electronic watermark data insertion system to which the present invention is applied.

Referring first to FIG. 1, there is shown an electronic watermark data insertion system to which the present invention is applied. The electronic watermark data insertion system shown includes a DCT calculator 103 for extracting blocks 102 of 8×8 pixels from within a current image 101 which makes an object of insertion of electronic watermark data and performing DCT (discrete cosine transform) calculation for the blocks 102, a quantizer 104 for quantizing data outputted from the DCT calculator 103, a quantization table 105 for being referred to when the quantizer 104 performs quantization, an electronic watermark data insertion element 107 for inserting electronic watermark data 106 into data after quantization, and an encoder 113 for encoding data outputted from the electronic watermark data insertion element 107 to produce MPEG data 114 in which the electronic watermark data 106 are inserted and outputting the MPEG data 114.

The electronic watermark data insertion element 107 includes a partial average calculator 108 for calculating a partial average of three neighboring points of data outputted from the quantizer 104 in accordance with $\mathrm{avg}(f(i)) = (|f(i-1)| + |f(i)| + |f(i+1)|)/3$, a multiplier 110 for multiplying outputs of the electronic watermark data 106 and the partial average calculator 108 for individual factors, another multiplier 111 for multiplying each factor of an output of the multiplier 110 by a constant 109 which is used to vary the size of the electronic watermark data to be inserted, and an adder 112 for adding an output of the multiplier 111 and the output of the quantizer 104 for individual factors.

The electronic watermark data insertion element 107 performs calculation defined by the following expression:

$$F(i) = f(i) + \mathrm{avg}(f(i)) \times w(i) \times \mathrm{constant}$$

where f(i) is the data outputted from the quantizer 104, avg(f(i)) is the data outputted from the partial average calculator 108, w(i) is the electronic watermark data 106, the constant is the constant 109, and i is the number of each factor after zigzag scanning of a block of 8×8 pixels.

Figure 2:
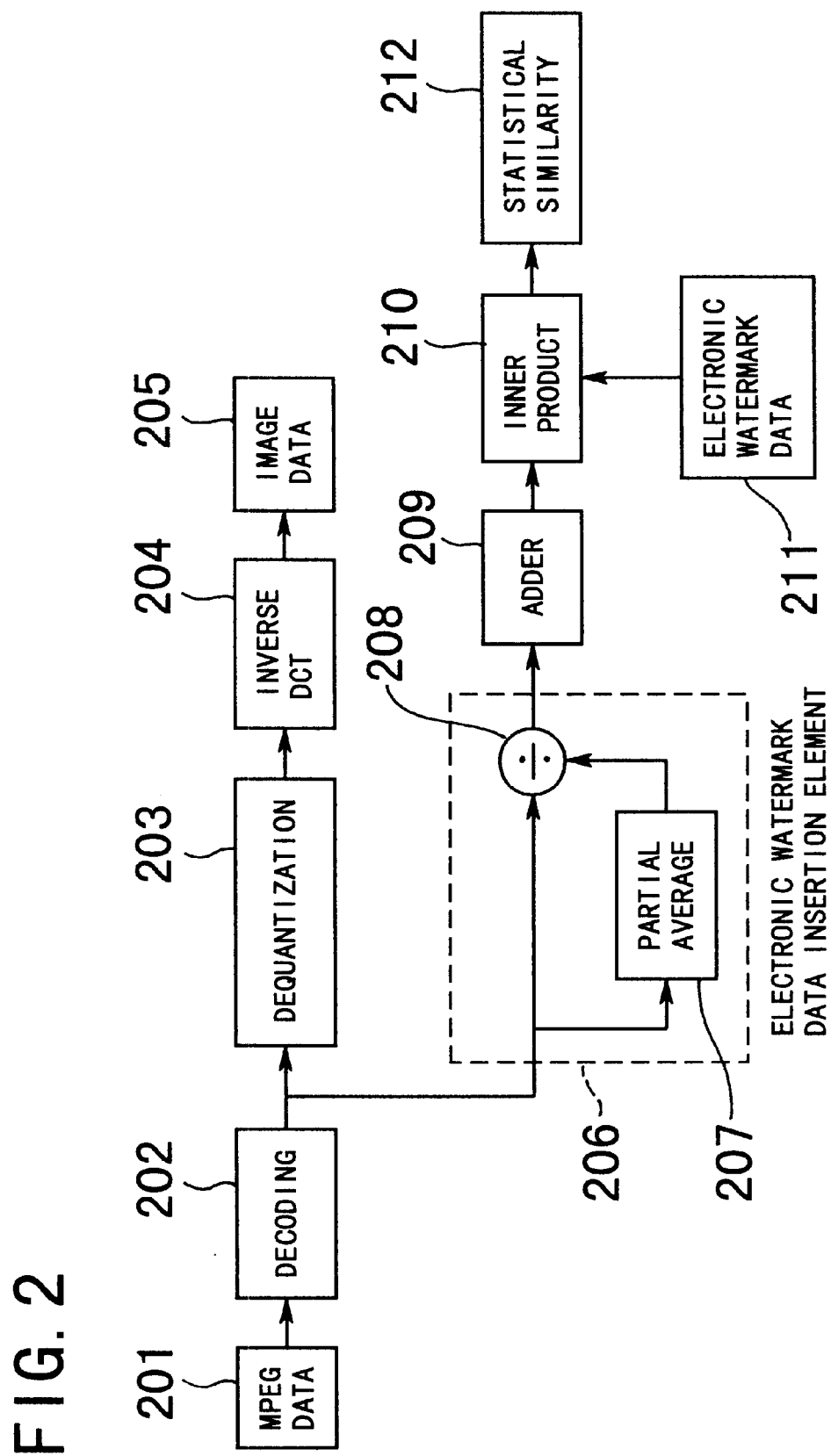
FIG. 2 is a block diagram of an electronic watermark data detection system to which the present invention is applied.

Referring now to FIG. 2, there is shown an electronic watermark data detection system to which the present invention is applied. The electronic watermark data detection system detects electronic watermark data inserted in an image by the electronic watermark data insertion system of FIG. 1 described above. The electronic watermark data detection system includes a decoder 202 for decoding MPEG data 201 which make an object of detection of electronic watermark data, a dequantizer 203 for dequantizing data outputted from the decoder 202, an inverse DCT calculator 204 for performing inverse DCT calculation for data outputted from the dequantizer 203 to obtain image data 205 and outputting the image data 205, an electronic watermark data extractor 206 for extracting, from among data outputted from the decoder 202, those data which are supposed to be electronic watermark data, an adder 209 for cumulatively adding data in units of a matrix block of 8×8 pixels outputted from the electronic watermark data extractor 206 for individual factors over one screen, and an inner product calculator 210 for calculating inner products of electronic watermark data 211 to be detected and data outputted from the adder 209 to obtain a statistical similarity 212 and outputting the statistical similarity 212.

The electronic watermark data extractor 206 includes a partial average calculator 207 for calculating a partial average of three neighboring points of data in units of a block of 8×8 pixels outputted from the decoder 202 in accordance with avg(F(i))=(|F(i−1)|+|F(i)|+|F(i+1)|)/3, and a divider 208 for dividing data F(i) outputted from the decoder 202 by a partial average avg(F(i)) outputted front the partial average calculator 207.

The electronic watermark data extractor 206 performs calculation defined by the following expression:

$$W(i)=F(i)/\text{avg}(F(i))$$

where F(i) is the data outputted from the decoder 202, avg(F(i)) is the partial average outputted from the partial average calculator 207, W(i) is the data which are supposed to include electronic watermark data outputted from the electronic watermark data extractor 206, and i is the number of each factor of a block of 8×8 pixels.

In the following, operation for insertion and detection of electronic watermark data of the electronic watermark data insertion and detection systems described above with reference to FIGS. 1 and 2 is described in detail with reference to FIGS. 1 and 2.

First, operation for insertion of electronic watermark data is described.

A current image 101 is extracted for each block of 8×8 pixels by ordinary MPEG compression processing, and the DCT calculator 103 performs DCT calculation for the thus extracted data. Data of frequency components obtained by the DCT calculation of the DCT calculator 103 are quantized with reference to the quantization table 105 by the quantizer 104. The electronic watermark data insertion element 107 embeds electronic watermark data 106 into the data outputted from the quantizer 104. In this instance, the electronic watermark data insertion element 107 performs processing equivalent to calculation of the following expression:

$$F(i)=f(i)+\text{avg}(f(i))\times w(i)\times \text{constant}$$

where i is the number of a factor of a frequency component of the block of 8×8 pixels, w(i) is the value of each factor of the electronic watermark data 106, the constant is the constant 109, f(i) is each of the factors of the 8×8 pixel block, avg(f(i)) is the average of absolute values of three neighboring factors, that is, (|f(i−1)|+|f(i)|+|f(i+1)|)/3, and F(i) is the new frequency component in which the electronic watermark data 106 are inserted.

The encoder 113 encodes the data F(i) outputted from the electronic watermark data insertion element 107 by MPEG processing to produce MPEG data 114 in which the electronic watermark data 106 are embedded.

Now, operation for detection of electronic watermark data is described.

First, MPEG data 201 which make an object of detection is subject to MPEG decoding by the decoder 202. The data decoded by the decoder 202 are dequantized by ordinary MPEG decoding processing by the dequantizer 203 and inverse DCT calculated by the inverse DCT calculator 204 to produce reproduction image data 205.

The electronic watermark data extractor 206 extracts the data decoded by the decoder 202, performs calculation of F(i)/avg(F(i)) and extracts those data which are supposed to be embedded electronic watermark data. Here, F(i) is the frequency component of a decoded block of 8×8 pixels, and avg(F(i)) is the partial average ((|F(i−1)|+|F(i)|+|F(i+1)|)/3. The adder 209 calculates a sum total of the extracted data in units of 8×8 pixels outputted from the electronic watermark data extractor 208 for individual factors over one screen. After the sum totals of the extracted data of the one screen are calculated, the inner product calculator 210 calculates inner products of the sum totals and electronic watermark data 211 to be detected to produce a statistical similarity 212 and outputs the statistical similarity 212.

If the statistical similarity 212 is higher than a particular fixed value, then it is discriminated that electronic watermark data equivalent to the electronic watermark data 211 are embedded in the MPEG data 201.

Figure 3:
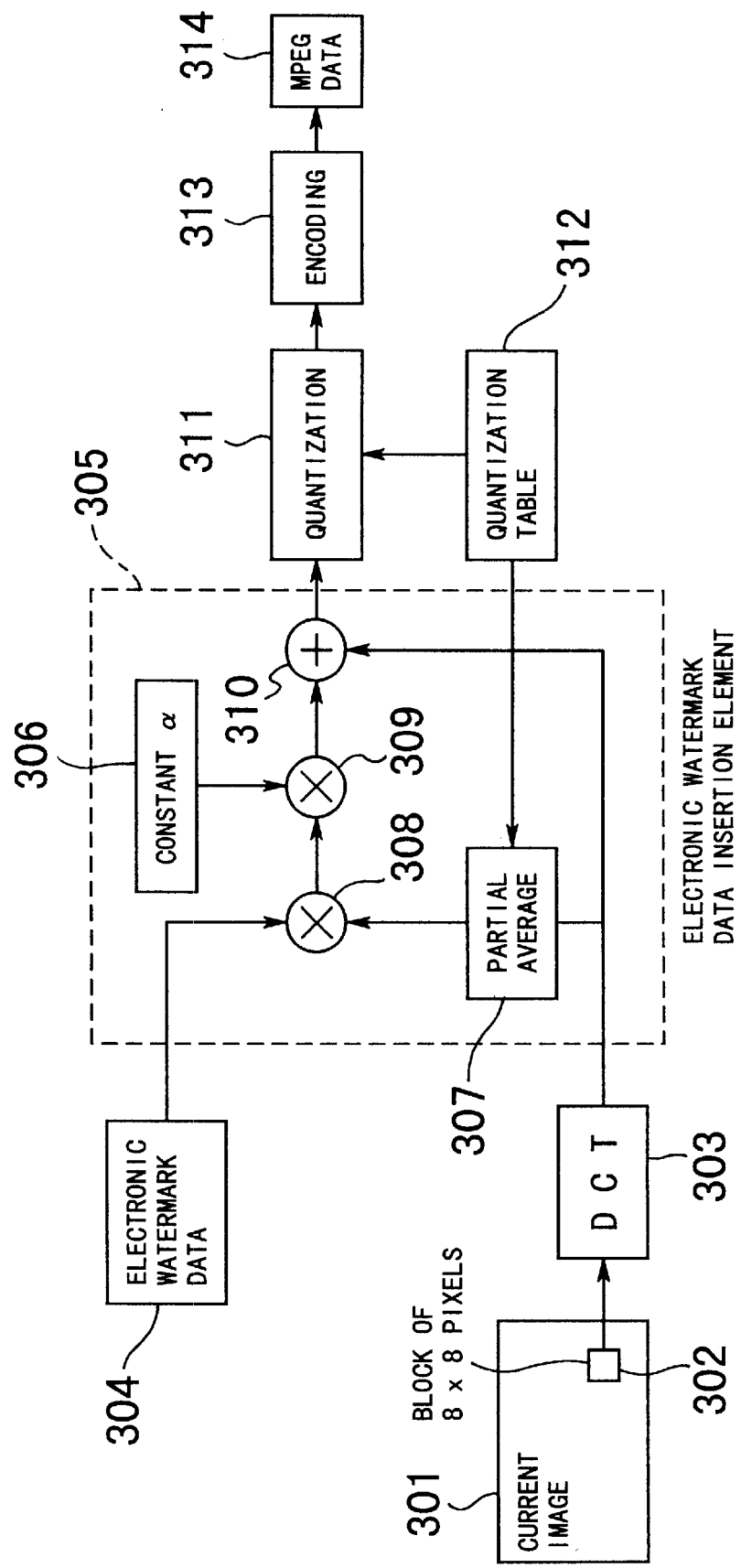
FIG. 3 is a block diagram of another electronic watermark data insertion system to which the present invention is applied.

In this instance, if the electronic watermark data 211 represent inhibition of duplication, then the reproduction apparatus in which the electronic watermark data detection system is incorporated can take such a countermeasure as to inhibit duplication of the image data 205 produced therein, Referring now to FIG. 3, there is shown another electronic watermark data insertion system to which the present invention is applied. The electronic watermark data insertion system includes a DCT calculator 303 for extracting matrix blocks 302 of 8×8 pixels from within a current image 301 which makes an object of insertion of electronic watermark data and performing DCT calculation for the blocks 302, an electronic watermark data insertion element 305 for inserting electronic watermark data 304 into data for which the DCT transform has been performed, a quantizer 311 for quantizing data outputted from the electronic watermark data insertion element 305, a quantization table 312 for being referred to when the quantizer 104 performs quantization and when the electronic watermark data insertion element 305 calculates a partial average, and an encoder 313 for encoding data outputted from the quantizer 311 and outputting MPEG data 314 in which the electronic watermark data 304 are embedded.

The electronic watermark data insertion element 305 includes a partial average calculator 307 for calculating a partial average of data outputted from the DCT calculator 303 with reference to the quantization table 312, a multiplier 308 for multiplying the output of the partial average calculator 307 by the electronic watermark data 304 for individual factors, another multiplier 309 for multiplying the data outputted from the multiplier 308 by a constant a 306 which is used to vary the size of the electronic watermark data to be inserted, and an adder 310 for adding the data outputted from the DCT calculator 303 and the data outputted from the multiplier 309 for individual factors. The electronic watermark data insertion element 305 thus performs processing equivalent to calculation of the following expression:

$$F(i)=f(i)+\text{avg}(f(i))\times w(i)\times\text{constant}$$

where f(i) is the data outputted from the DCT calculator 303, avg(f(i)) is the data outputted from the partial average calculator 307, w(i) is the electronic watermark data 304, the constant is the constant α 306, and i is the number of a factor after the data outputted from the DCT calculator 303 are zigzag scanned.

Here, the partial average calculator 307 in the electronic watermark data insertion element 305 performs, in order to calculate a partial average avg(f(i)) of three neighboring points of the data outputted from the DCT calculator 303, processing equivalent to calculation of the following expressions:

$$V(i-1)=|\text{integral part of }(f(i-1)/Q(i-1))\times Q(i-1)|$$

$$V(i)=|\text{integral part of }(f(i)/Q(i))\times Q(i)|$$

$$V(i+1)=|\text{integral part of }(f(i+1)/Q(i+1))\times Q(i+1)|$$

$$\text{avg}(f(i))=(V(i-1)+V(i)+V(i+1))/3$$

Figure 4:
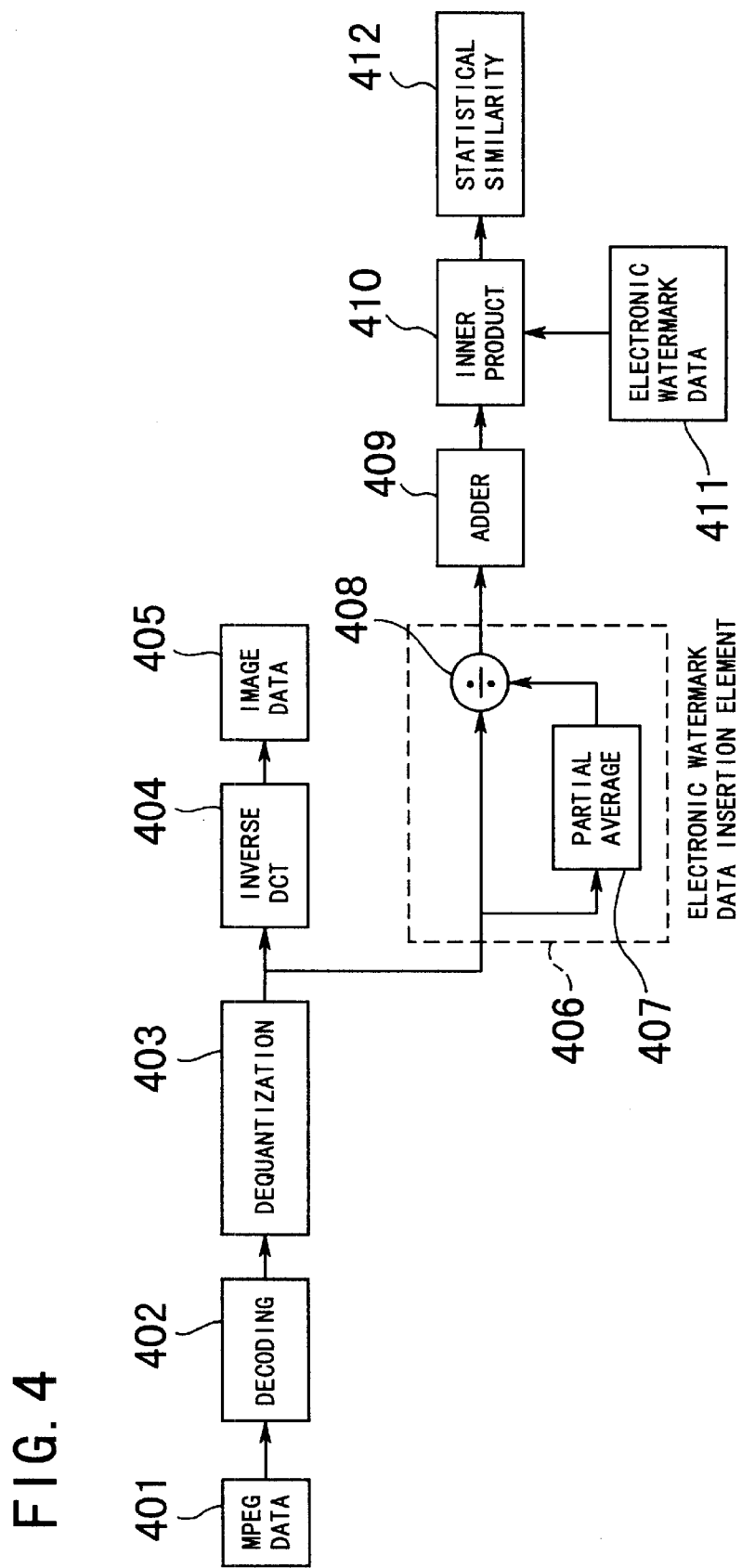
FIG. 4 is a block diagram of another electronic watermark data detection system to which the present invention is applied.
Figure 5:
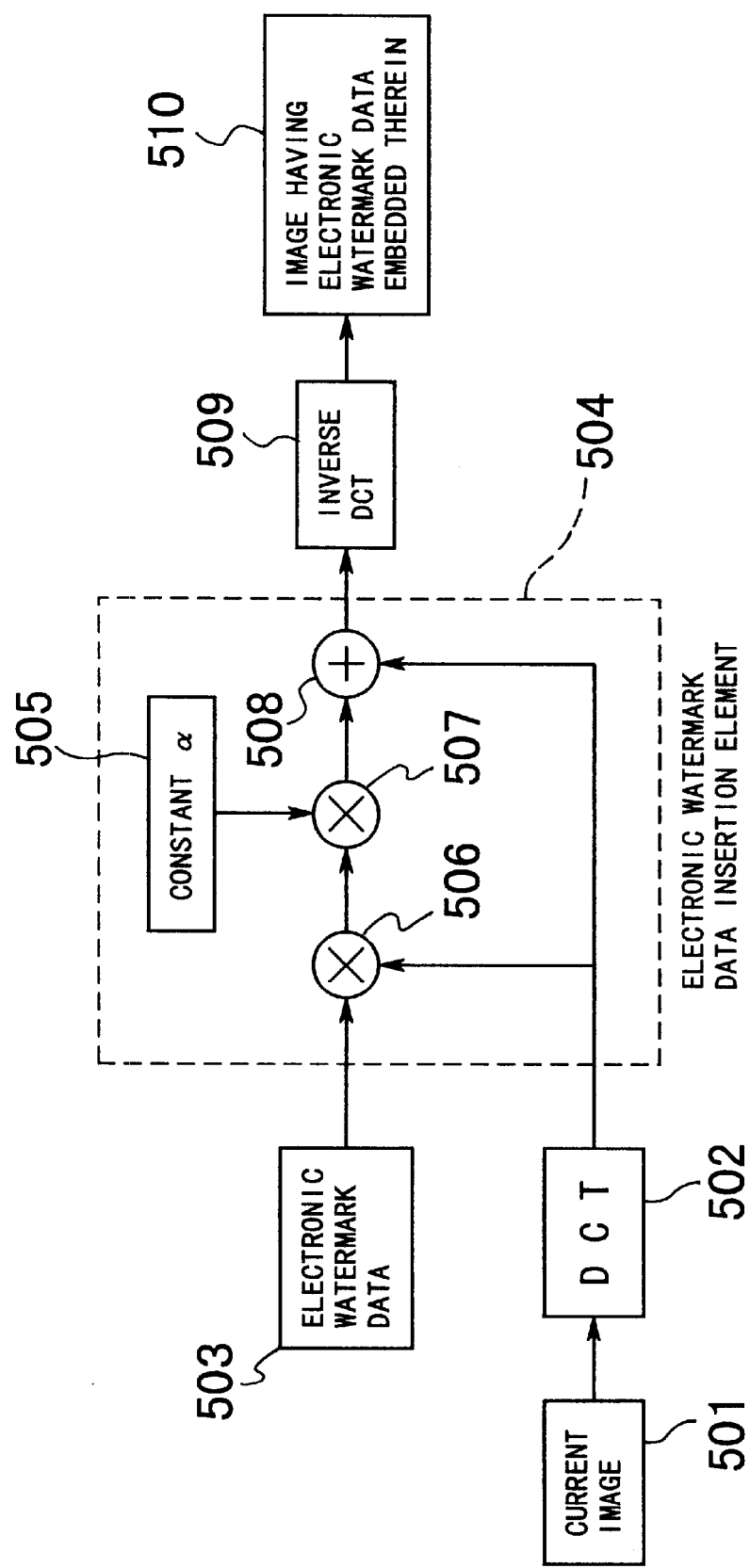
FIG. 5 is a block diagram showing a conventional electronic watermark data insertion system.
Figure 6:
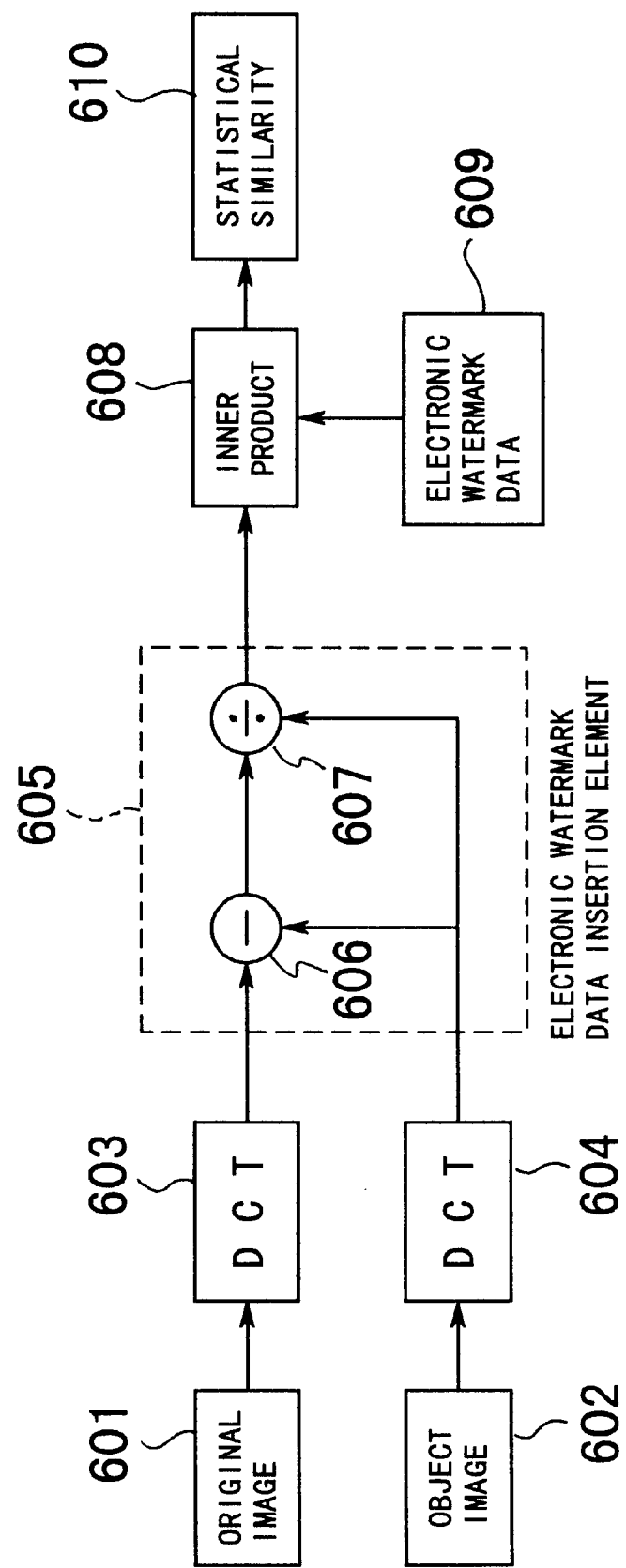
FIG. 6 is a block diagram showing a conventional electronic watermark data detection system.
Figure 7:
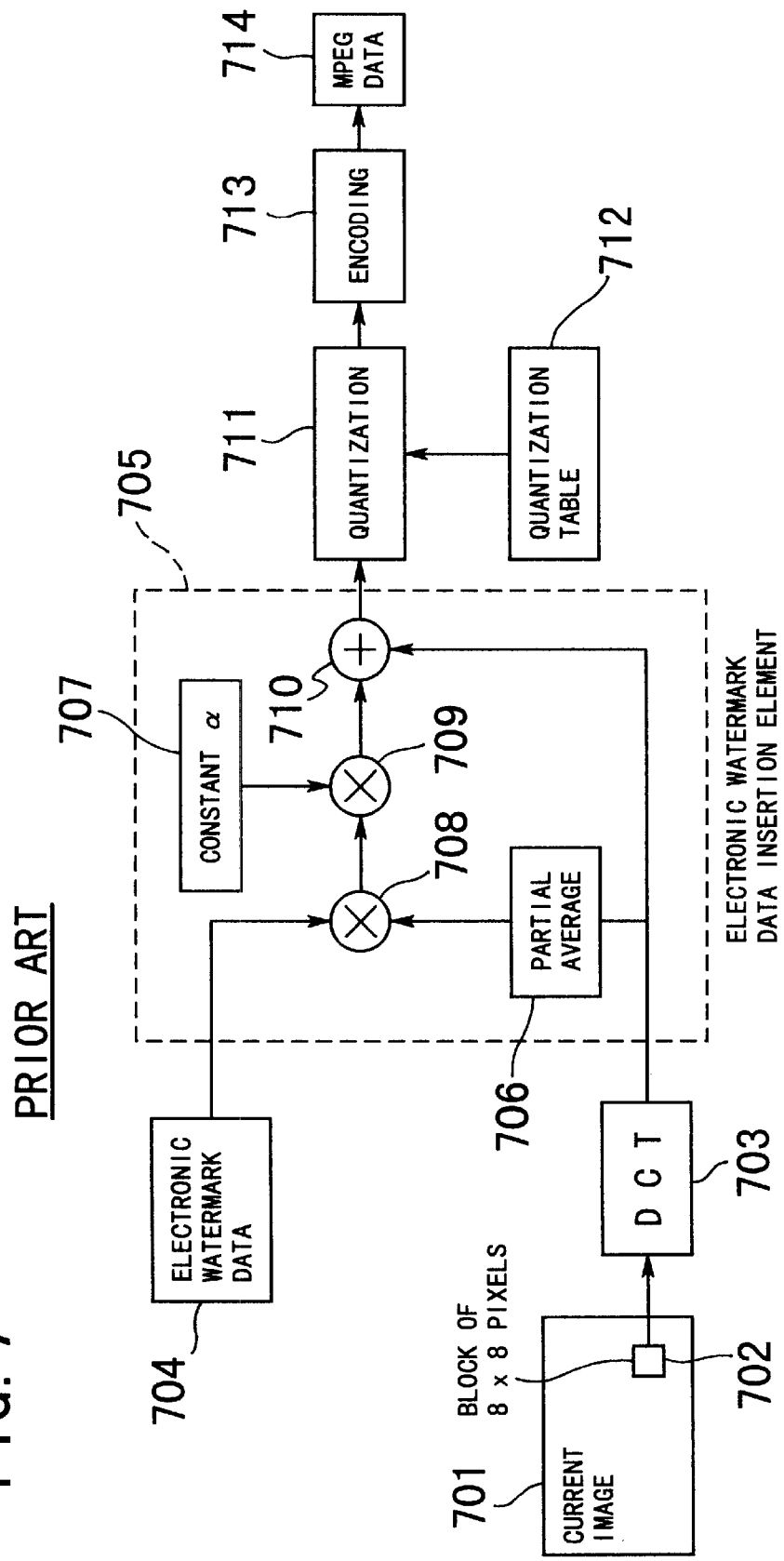
FIG. 7 is a block diagram showing another conventional electronic watermark data insertion system.
Figure 8:
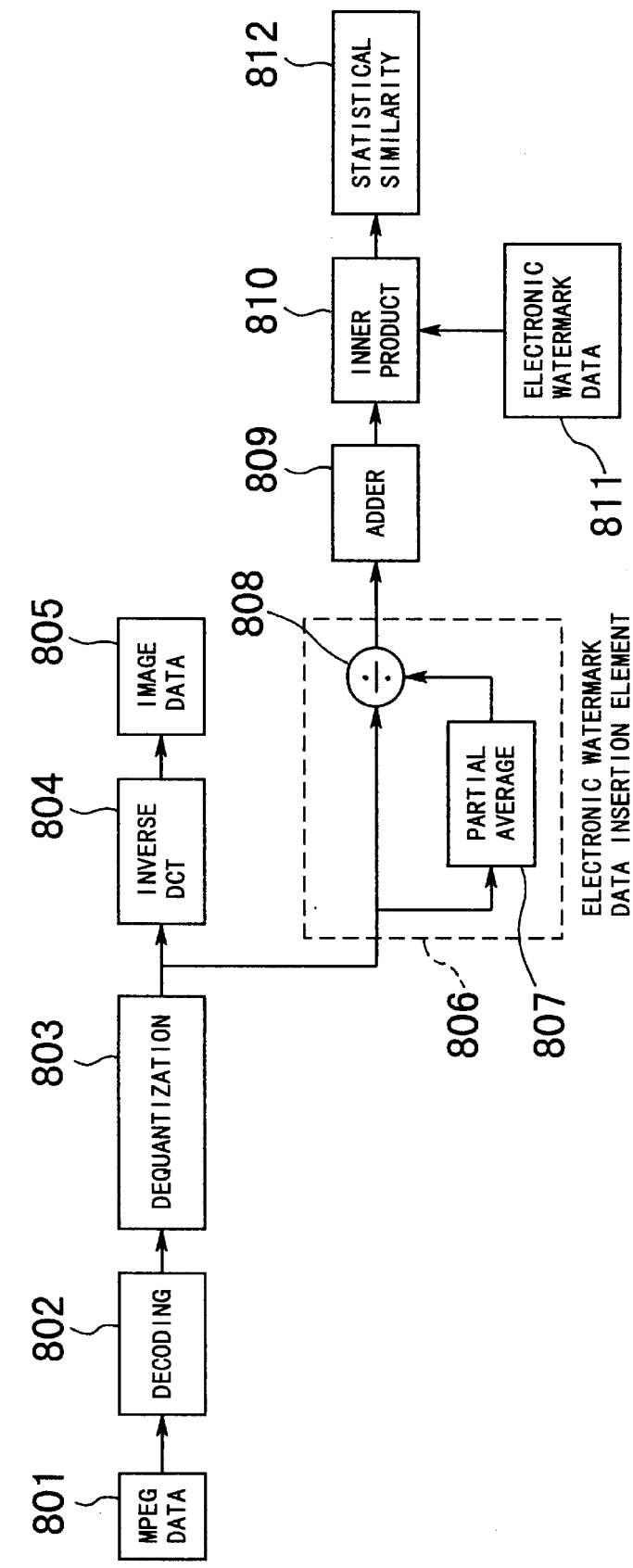
FIG. 8 is a block diagram showing another conventional electronic watermark data detection system.

Referring now to FIG. 4, there is shown another electronic watermark data detection system to which the present invention is applied. The electronic watermark data detection system detects electronic watermark data inserted by the electronic watermark data insertion system described above with reference to FIG. 3. To this end, it includes a decoder 402 for decoding MPEG data 401 which make an object of detection of electronic watermark data, a dequantizer 403 for dequantizing data outputted from the decoder 402, an inverse DCT calculator 404 for performing inverse DCT calculation for data outputted from the dequantizer 403 to obtain image data 405 and outputting the image data 405, an electronic watermark data extractor 406 for extracting, from among the data outputted from the dequantizer 403, those data which are supposed to be electronic watermark data and outputting the extracted data, an adder 409 for adding data in matrix units of an 8×8 pixel block outputted from the electronic watermark data extractor 406 for individual factors over one screen, and an inner product calculator 410 for calculating inner products of data outputted from the adder 409 and electronic watermark data 411 to be detected to obtain a statistical similarity 412 and outputting the statistical similarity 412.

The electronic watermark data extractor 406 includes a partial average calculator 407 for calculating a partial average of three neighboring points of data in units of 8×8 pixel block outputted from the dequantizer 403 in accordance with avg(F(i))=(|F(i−1)|+|F(i)|+|F(i+1)|)/3, and a divider 408 for dividing the data F(i) outputted from the dequantizer 403 by the partial average avg(F(i)) outputted from the partial average calculator 407. Here, F(i) is the frequency component of an 8×8 pixel block outputted from the dequantizer 403, and i is the number of each factor after zigzag scanning of the 8×8 pixel block.

The electronic watermark data extractor 406 performs calculation in accordance with the following expression:

$$W(i)=F(i)/\text{avg}(F(i))$$

where F(i) is the data outputted from the inverse DCT calculator 404, avg(F(i)) is the partial average outputted from the partial average calculator 407, and W(i) is the data outputted from the electronic watermark data extractor 406 and supposed to include electronic watermark data.

In the following, operation for insertion and detection of electronic watermark data of the electronic watermark data insertion and detection systems described above with reference to FIGS. 3 and 4 is described in detail with reference to FIGS. 3 and 4.

First, operation for insertion of electronic watermark data is described.

A current image 301 is extracted for individual blocks 302 of 8×8 pixels by ordinary MPEG compression processing, and the DCT calculator 303 performs DCT calculation for the thus extracted data. The electronic watermark data insertion element 305 embeds electronic watermark data 304 into the data of frequency components obtained by the DCT transform. In this instance, the electronic watermark data insertion element 305 performs processing equivalent to calculation of the following expression:

$$F(i)=f(i)+\text{avg}(f(i))\times w(i)\times\text{constant}$$

where i is the factor number after zigzag scanning of a block of 8×8 pixels, f(i) is the value of each coefficient obtained by the DCT transform, w(i) is the value of each factor of the electronic watermark data 304, and avg(f(i)) is the average of absolute values of three neighboring points of each factor. Here, avg(f(i)) is calculated in accordance with the following expressions:

$$V(i-1)=|\text{integral part of }(f(i-1)/Q(i-1))\times Q(i-1)|$$

$$V(i)=|\text{integral part of }(f(i)/Q(i))\times Q(i)|$$

$$V(i+1)=|\text{integral part of }(f(i+1)/Q(i+1))\times Q(i+1)|$$

$$\text{avg}(f(i))=(V(i-1)+V(i)+V(i+1))/3$$

The quantizer 311 refers to the quantization table 312 to perform quantization processing for the data outputted from the electronic watermark data insertion element 305, and the encoder 313 performs encoding of the data outputted from the quantizer 311 to produce MPEG data 314.

Now, operation for detection of electronic watermark data is described.

First, MPEG data 401 which make an object of detection are subject to MPEG decoding processing by the decoder 402. The data decoded by the decoder 402 are dequantized by ordinary MPEG decoding processing by the dequantizer 403, and inverse DCT calculated by the inverse DCT calculator 404 to produce image data 405.

The electronic watermark data extractor 406 extracts decoded data from the dequantizer 403, performs calculation of F(i)/avg(F(i)) and extracts data supposed to be embedded electronic watermark data. Here, F(i) is the value of each factor after zigzag scanning in units of an 8×8 pixel block outputted from the dequantizer 403, and avg(F(i)) is the partial average (|F(i−1)|+|F(i)|+|F<(i+1)|)/3. The adder 409 calculates sum totals of the extracted data in units of an 8×8 pixel block outputted from the electronic watermark data extractor 406 for individual factors over one screen. After the sum totals of the extracted data for one screen are calculated, the inner product calculator 410 calculates inner products of the sum totals and the electronic watermark data 411 to be detected to obtain a statistical similarity 412 and outputs the statistical similarity 412.

If the statistical similarity 412 is higher than a particular fixed value, then it is discriminated that electronic watermark data equivalent to the electronic watermark data 411 are embedded in the MPEG data 401.

In this instance, if the electronic watermark data 411 represent inhibition of duplication, then the reproduction apparatus in which the electronic watermark data detection system is incorporated can take such a countermeasure as to inhibit duplication of the image data 405 produced therein.

Having now fully described the invention, it will be apparent to one of ordinary skill in the art that many changes and modifications can be made thereto without departing from the spirit and scope of the invention as set forth herein.

What is claimed is:

1. An electronic watermark insertion apparatus, comprising:

conversion means for performing discrete cosine transform for an original image to convert the original image into data f(i) of frequency components, i being 1, 2, ..., n;

electronic watermark insertion means for multiplying a partial average of the data f(i) and electronic watermark data w(i) determined in advance for the individual factors (i), i being 1, 2, ..., n, and adding the data f(i) to the results obtained by multiplying the results of the multiplication by a constant to determine an electronic watermark containing data F(i), i being 1, 2, ..., n;

quantization means for quantizing the data F(i) with a quantization step sizes Q(i), i being 1, 2, ..., n; and coding means for compression coding the data after the quantization;

the partial average of the data f(i) being given by (V(i−1)+V(i)+V(i+1))/3 where V(i−1)=|integral part of (f(i−1)/Q(i−1)×Q(i−1)|, V(i)=|integral part of (f(i)/Q(i)×Q(i)|, and V(i+1)=|integral part of (f(i+1)/Q(i+1)×Q(i+1)|.

2. An electronic watermark detection apparatus to which data obtained by performing a discrete cosine transform for an original image to convert the original image into data f(i) of frequency components, i being 1, 2, ..., n, multiplying a partial average of the data f(i) and electronic watermark data w(i) determined in advance for the individual factors (i), i being 1, 2, ..., n, and adding the data f(i) to the results obtained by multiplying the results of the multiplication by a constant to determine electronic watermark containing data F(i), i being 1, 2, ..., n, quantizing the data F(i) with quantizaiton step sizes Q(i), i being 1, 2, ..., n, and then compression coding the data after the quantization, the partial average of the data f(i) being given by $$(V(i-1)+V(i)+V(i+1))/3$$

where V(i−1)=|integral part of (f(i−1)/Q(i)×Q(i−1)|, V(i)=|integral part of (f(i)/Q(i)×Q(i)|, and V(i+1)=|integral part of (fi+1)/Q(i+1)×Q(i+1)|, the apparatus comprising:

decoding means for decoding the compression coded data;

dequantization means for dequantizing data F(i) obtained by the decoding, i being 1, 2, ..., n;

inverse discrete cosine transform means for performing an inverse discrete cosine transform for data obtained by the dequantization in order to restore the original image; and electronic watermark detection means for calculating a statistical similarity between values obtained by dividing the data F(i) by a partial average (|F(i−1)|+|F(i)|+|F(i+1)|)/3 of the data F(i) and the electronic watermark data to discriminate whether or not the electronic watermark is included in the data supplied to said electronic watermark detection apparatus.

3. An electronic watermark insertion method, comprising:

a conversion step of performing a discrete cosine transform for an original image in order to convert the original image into data f(i) of frequency components, i being 1, 2, ..., n;

an electronic watermark insertion step of multiplying a partial average of the data f(i) and electronic watermark data w(i) determined in advance for the individual factors (i), i being 1, 2, ..., n, and adding the data f(i) to the results obtained by multiplying the results of the multiplication by a constant to determine an electronic watermark containing data F(i), i being 1, 2, ..., n;

a quantization step of quantizing the data F(i) with quantization step sizes Q(i), i being 1, 2, ..., n; and a coding step of compression coding the data after the quantization;

the partial average of the data f(i) being given by (V(i−1)+V(i)+V(i+1))/3 where V(i−1)=|integral part of (f(i−1)/Q(i−1)×Q(i−1)|, and V(i+1)=|integral part of (f(i+1)/Q(i+1)×Q(i−1)|.

4. An electronic watermark detection method to which data obtained by performing a discrete cosine transform for an original image to convert the original image into data f(i) of frequency components, i being 1, 2, ..., n, multiplying a partial average of the data f(i) and electronic watermark data w(i) determined in advance for the individual factors (i), i being 1, 2, ..., n, and adding the data f(i) to the results obtained by multiplying the results of the multiplication by a constant in order to determine an electronic watermark containing data F(i), i being 1, 2, ..., n, quantizing the data F(i) with quantization step sizes Q(i), i being 1, 2, ..., n, and then compression coding the data after the quantization, the partial average of the data f(i) being given by $$(V(i-1)+V(i)+V(i+1))/3$$

where V(i−1)=|integral part of (f(i−1)/Q(i)×Q(i−1)|, V(i)=integral part of (f(i)/Q(i)×Q(i)|, and V(i+1)=|integral part of (f(i+1)/Q(i+1)×Q(i+1)|, the method comprising:

a decoding step of decoding the compression coded data;

a dequantization step of dequantizing the data (i) obtained by the decoding, i being 1, 2, ..., n;

an inverse discrete cosine transform step of performing an inverse discrete cosine transform for data obtained by the dequantization in order to restore the original image; and an electronic watermark detection step of calculating a statistical similarity between values obtained by dividing the data F(i) by a partial average (|F(i−1)|+|F(i)|+|F(i+1)|)/3 of the data F(i) and the electronic watermark data to discriminate whether or not the electronic watermark is included in the data supplied to the electronic watermark detection method.

* * * * *